UNITED STATES PATENT OFFICE.

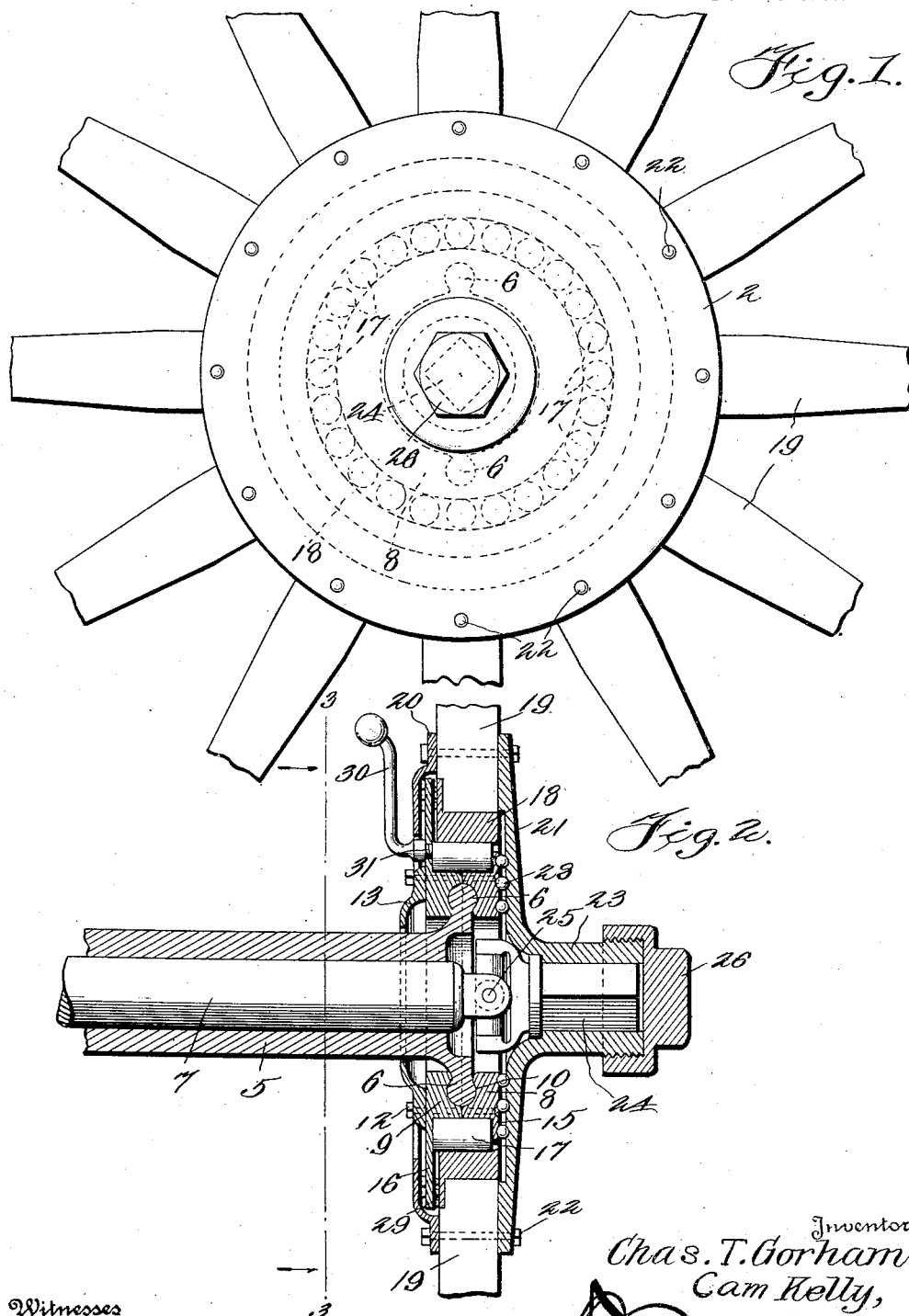

CHARLES T. GORHAM AND CAM KELLY, OF CLINTONVILLE, WISCONSIN.

FRONT-WHEEL DRIVE.

1,234,752. Specification of Letters Patent. Patented July 31, 1917.

Application filed December 4, 1915. Serial No. 65,155.

*To all whom it may concern:*

Be it known that we, CHARLES T. GORHAM and CAM KELLY, citizens of the United States, residing at Clintonville, in the county of Waupaca and State of Wisconsin, have invented certain new and useful Improvements in Front-Wheel Drives; and we do hereby declare the following to be a full, clear, and exact description of the invention, such as will enable others skilled in the art to which it appertans to make and use the same.

This invention relates to improvements in front or steering wheel drives, particularly designed for use in connection with modern types of motor vehicles, and has for its primary object to generally improve and simplify the construction of combined driving and steering wheels and provides a device of this character which shall be thoroughly practical and comparatively inexpensive.

With this and other objects in view, the invention consists in the novel construction, arrangement and formation of parts as will be hereinafter specifically described, claimed and illustrated in the accompanying drawing, in which:

Figure 1 represents a fragmental side elevation of the improved wheel,

Fig. 2 represents a fragmental vertical sectional view therethrough,

Figure 3:
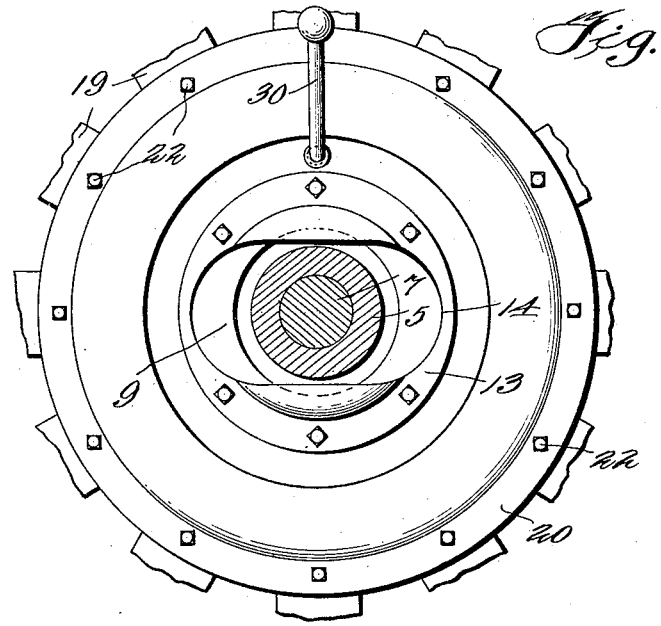
Figure 4:
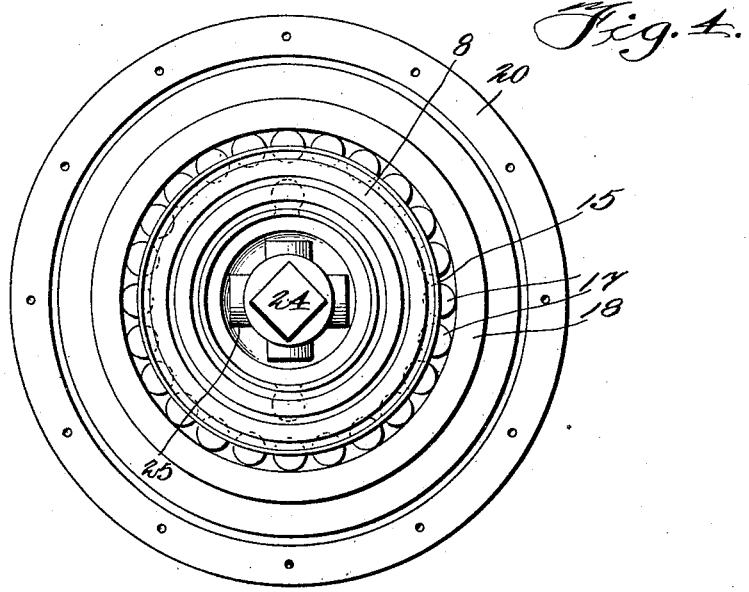

Fig. 3 represents a vertical sectional view at right angles to Fig. 2, taken on the line 3—3 of Fig. 2, Fig 4 represents a side elevation of the hub of the wheel, the outer plate and hub cap being removed Referring to the drawing in detail, wherein similar reference numerals designate corresponding parts throughout the several views, the numerals 5 indicate the casing or housing of the front axle of a motor vehicle at each end of which is formed a pair of vertically alined trunnions 6 and within which is housed the drive shaft 7. A pair of rings 8 and 9 are formed at diametrically opposed points with semispherical recesses 10, which, when moved into registration provide pockets receiving the knobs or trunnions 6 of the casing 5, whereby the rings are secured for swinging movement upon a vertical axis to permit of steering movement of the wheel. The rings 8 are detachably connected by bolts 12, which latter also secure a guard plate 13 to the rings, the guard plate being formed with a horizontally elongated opening 14, clearly illustrated in Fig. 3, designed to permit free swinging movement of the steering wheel without contact with the front axle casing 5. The rings 8 and 9 are formed with outwardly directed spaced flanges 15 and 16, respectively, forming a channel in which is mounted a plurality of bearing rollers 17 supporting an annular bearing member 18 with which the inner extremities 19 of the spokes of the wheel are engaged.

The inner extremities of the spokes 19 are clamped between the inner and outer hub plates 20 and 21, respectively, bolts, or equivalent means, 22 being provided to rigidly secure the spokes in position between the plates. The outer hub plate 21 is formed with an integral outwardly directed flange 23 having an angular bore receiving the polygonal stub shaft 24, whereby the latter is secured against rotary movement within the flange 23. The inner extremity of the slidable stub shaft 24 is connected by a preferred type of universal joint, designated generally by the numeral 25, with the adjacent extremity of the front driving axle 7 of the vehicle, and a hub cap 26 is fitted over the outer extremity of the annular flange 23 to protect the interior of the hub of the wheel against the entrance of dirt. The end of the axle casing 5, intermediate the trunnions 6, is oppositely beveled or tapered so as to accommodate the universal movement of the universal joint 25.

The adjacent surfaces of the outer ring 8 and flange 15 and the hub plates 21 are formed with axially co-incident circular grooves receiving a plurality of bearing balls 28, designed to prevent frictional engagement of the inner surface of the hub plate 21 with the outer ring 8 during rotation of the vehicle wheel. A plurality of bearing balls 29 are also arranged between the outer bearing member 18 and the flange 16 of the inner ring 9 and also between the flange 16 and the inner hub plate 20.

A steering arm 30 is formed with an exteriorly screw-threaded shank 31, rigidly secured in an aperture formed in the outwardly directed flange 16 of the inner ring 9 and is adapted to be connected with the steering gear of the vehicle whereby the wheel may be bodily turned upon the vertically alined trunnions or knobs to steer the vehicle.

What we claim is:

1. In combination, an axle, a casing inclosing said axle, a pair of vertically alined trunnions formed at the end of said casing, a two-part ring pivotally supported upon said trunnions, a bearing ring arranged in spaced concentric relation to the two-part ring, a wheel hub connected with said ring and including inner and outer hub plates, an outwardly directed flange carried by the two part ring confined between the bearing ring and the inner hub plate, and friction reducing means interposed between the inner hub plate, and flange.

2. In combination, an axle, a casing inclosing said axle, a two-part ring pivotally secured to said axle, relatively wide and narrow spaced flanges carried by said ring providing a circular channel, a bearing ring arranged in spaced concentric relation to the first-mentioned ring, friction reducing means arranged in said channel and interposed between the bearing ring and the two-part ring, a wheel hub associated with the bearing ring and including inner and outer hub plates, and the relatively wide flange being confined between the bearing ring and the inner hub plate.

3. In combination, an axle, a casing inclosing said axle, a pair of companion rings pivotally secured to said axle, relatively wide and narrow spaced flanges carried by said rings providing a circular channel, a bearing ring arranged in spaced concentric relation to the first-mentioned rings, friction reducing means arranged in said channel and interposed between the bearing ring and the companion rings, a wheel hub including an inner hub plate arranged on the side of the relatively wide flange opposite and connected with the bearing ring, friction reducing means interposed between the relatively wide flange and the hub plate, and friction reducing means arranged between the bearing ring and the relatively wide flanges.

4. In combination, an axle, a casing inclosing said axle, a pair of inner and outer companion rings pivotally secured to said axle casing, relatively wide and narrow spaced flanges carried by said rings providing a circular channel, a bearing ring arranged in spaced concentric relation to the companion rings, friction reducing means arranged in said channel and interposed between the companion rings and the bearing ring, inner and outer hub plates, friction reducing means interposed between the inner plate and the inner surface of the relatively wide flange, friction reducing means interposed between the relatively wide flange and the bearing ring, friction reducing means interposed between the outer companion ring and the outer hub plate, and a driving connection between the axle and the outer hub plate.

In testimony whereof we affix our signatures in presence of two witnesses.

CHARLES T. GORHAM.
CAM KELLY.

Witnesses:
ROB SCHNEIDEKE,
WILLIAM H. SWINTON.